United States Patent
Nagata et al.

(10) Patent No.: US 10,802,316 B2
(45) Date of Patent: Oct. 13, 2020

(54) LIQUID CRYSTAL DISPLAY DEVICE

(71) Applicant: SHARP KABUSHIKI KAISHA, Sakai, Osaka (JP)

(72) Inventors: Hisashi Nagata, Sakai (JP); Yasuyoshi Kaise, Sakai (JP); Jin Nakamura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/379,031

(22) Filed: Apr. 9, 2019

(65) Prior Publication Data

US 2019/0310501 A1 Oct. 10, 2019

(30) Foreign Application Priority Data

Apr. 10, 2018 (JP) ................. 2018-075569

(51) Int. Cl.
| | | |
|---|---|---|
| *G02F 1/1333* | (2006.01) | |
| *G02F 1/1368* | (2006.01) | |

(Continued)

(52) U.S. Cl.
CPC ...... *G02F 1/133371* (2013.01); *G02F 1/1337* (2013.01); *G02F 1/1368* (2013.01);
(Continued)

(58) Field of Classification Search
CPC .. G02F 1/1368; G02F 1/1337; G02F 1/13338; G02F 1/133528; G02F 2001/136222; G02F 2203/01; G02F 1/133371; G02F 1/133514; G02F 1/133512; G02F 1/136209; G02F 1/13473;
(Continued)

(56) References Cited

U.S. PATENT DOCUMENTS

| | | | |
|---|---|---|---|
| 2013/0258234 A1* | 10/2013 | Park ................. | G02F 1/133512 349/58 |
| 2016/0011460 A1* | 1/2016 | Park ................. | G02F 1/134363 349/114 |

(Continued)

FOREIGN PATENT DOCUMENTS

JP    2013-205840 A    10/2013

*Primary Examiner* — Shan Liu
(74) *Attorney, Agent, or Firm* — ScienBiziP, P.C.

(57) ABSTRACT

The present invention provides a liquid crystal display device which can prevent a camera image from being adversely affected by the birefringence of external polarized light which enters a camera through the liquid crystal layer. In a liquid crystal display device (1A), light to enter a camera (3) passes through a part of a liquid crystal panel (10A). The liquid crystal panel (10A) is configured so that the first part of the liquid crystal layer (14), which first part is located in the camera light transmissive region (S1) allowing the light to enter the camera 3 to pass therethrough, has a retardation R1 represented by the following formula: $R1 = m\lambda$ (where (i) m is a positive integer and (ii) $\lambda$ is a wavelength of the light passing through the liquid crystal layer). A second part of the liquid crystal layer (14), which second part is located in a non-camera light transmissive region (S2) excluding the camera light transmissive region (S1), has a retardation R2 represented by the following formula: $R2 = \lambda/2(2k+1)$ (where k is 0 or an integer).

4 Claims, 4 Drawing Sheets

(51) Int. Cl.
  *G02F 1/1337* (2006.01)
  *G02F 1/1335* (2006.01)
  *G02F 1/1362* (2006.01)

(52) U.S. Cl.
  CPC .... *G02F 1/13338* (2013.01); *G02F 1/133528* (2013.01); *G02F 2001/136222* (2013.01); *G02F 2203/01* (2013.01)

(58) Field of Classification Search
  CPC ........... G02F 2001/136218; H01J 11/44; H01J 2211/444; H01J 2329/323; H01J 29/327
  USPC .................................................. 349/106–111
  See application file for complete search history.

(56) References Cited

U.S. PATENT DOCUMENTS

| | | | |
|---|---|---|---|
| 2016/0161798 A1* | 6/2016 | Lee | G02F 1/133528 349/65 |
| 2016/0223863 A1* | 8/2016 | Mizunuma | G02F 1/133617 |
| 2020/0117034 A1* | 4/2020 | Yin | G06F 1/1643 |

* cited by examiner

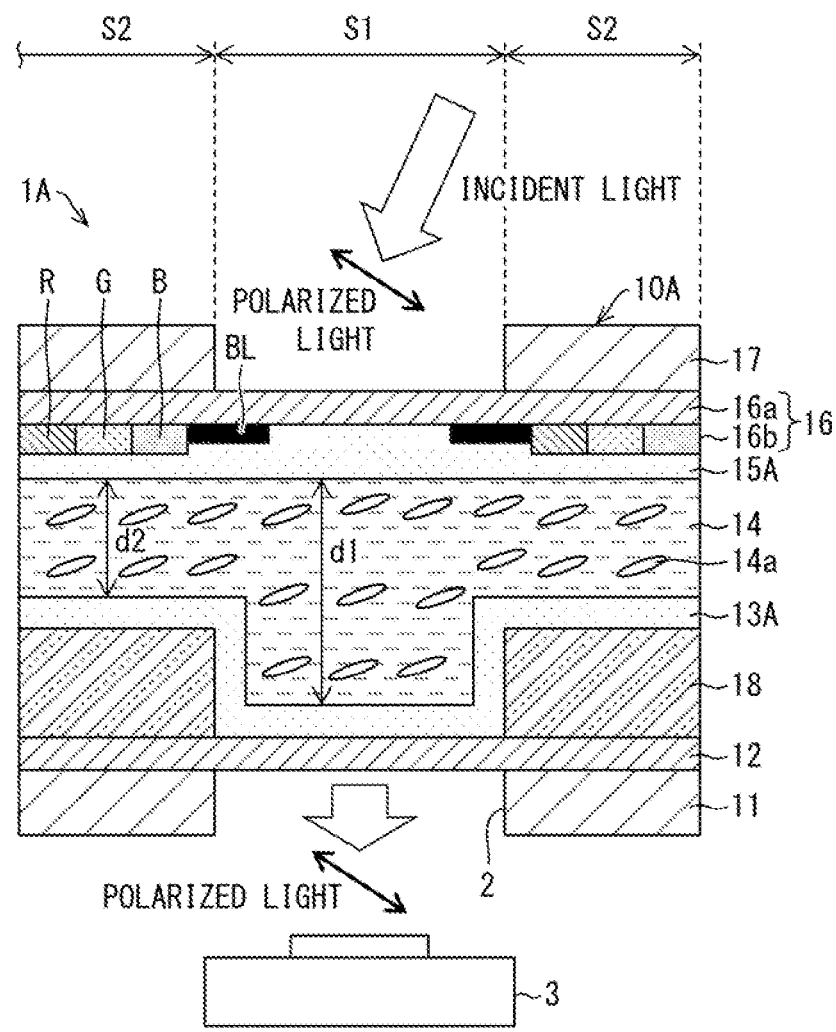

LIQUID CRYSTAL DISPLAY DEVICE

This Nonprovisional application claims priority under 35 U.S.C. § 119 on Patent Application No. 2018-075569 filed in Japan on Apr. 10, 2018, the entire contents of which are hereby incorporated by reference.

TECHNICAL FIELD

The present invention relates to a liquid crystal display device in which light to enter a camera passes through a part of a display section.

BACKGROUND ART

There are conventionally known liquid crystal display devices, in each of which a transmissive part for a camera is provided in a part of a display panel, in which part there are no pixels or no color filter.

For example, according to a display device disclosed in Patent Literature 1, (i) a transmissive hole is provided in a black matrix so that light passes through the transmissive hole and (ii) external light passes through the transmissive hole and a liquid crystal layer and then enters a camera.

According to the display device disclosed in Patent Literature 1, the occurrence of a diffraction phenomenon is prevented by the transmissive hole which is, for example, filled with a filler having a refractive index identical to that of a substrate.

CITATION LIST

Patent Literature

Patent Literature 1

Japanese Patent Application Publication, Tokukai, No. 2013-205840 (Publication Date: Oct. 7, 2013)

SUMMARY OF INVENTION

Technical Problem

According to a camera-embedded display panel into which light enters through a liquid crystal layer, the following problem occurs in a case where light entering the camera has a polarized light component (e.g., light reflected by a water surface): the birefringence in a part of the liquid crystal layer, which part corresponds to the transmissive part for the camera, leads to coloring or light-blocking of a camera image.

This is because the part of the liquid crystal layer 114, which part corresponds to the transmissive part T1 for the camera, is subjected to an alignment process in a manner similar to a part of an active area AA where pixels are present, so that liquid crystal molecules 114a are oriented in one direction also in the part (see FIG. 4). Consequently, in a case where light having a polarized light component passes through the liquid crystal molecules 114a having a polarized light component as a result of an alignment process, the light then has an unnecessary birefringence effect.

The display device disclosed in Patent Literature 1 does not deal with such an adverse effect on a camera image caused by the birefringence of external light having a polarized light component.

The present invention has been made in view of the conventional problem, and it is an object of the present invention to provide a liquid crystal display device which can prevent a camera image from being adversely affected by the birefringence of external polarized light which enters the camera through the liquid crystal layer.

Solution to Problem

In order to attain the object, a liquid crystal display device in accordance with an aspect of the present invention is a liquid crystal display device including: a display section including a liquid crystal layer; and a camera, the liquid crystal display device being configured so that light to enter the camera passes through a part of the display section, the display section being configured so that: a first part of the liquid crystal layer, which first part is located in a camera light transmissive region allowing the light to enter the camera to pass therethrough, has a retardation R1 represented by the following formula:

$$R1 = m\lambda$$

where (i) $\lambda$ is a wavelength of the light passing through the liquid crystal layer and (ii) m is a positive integer; and a second part of the liquid crystal layer, which second part is located in a non-camera light transmissive region excluding the camera light transmissive region, has a retardation R2 represented by the following formula:

$$R2 = \lambda/2(2k+1)$$

where (i) $\lambda$ is the wavelength of the light passing through the liquid crystal layer and (ii) k is 0 or an integer.

Advantageous Effects of Invention

With an aspect of the present invention, it is advantageously possible to provide a liquid crystal display device which can prevent a camera image from being adversely affected by the birefringence of external polarized light which enters the camera through the liquid crystal layer.

BRIEF DESCRIPTION OF DRAWINGS

FIG. 1 is a cross-sectional view illustrating a configuration of a liquid crystal display device in accordance with Embodiment 1 of the present invention.

DESCRIPTION OF EMBODIMENTS

Embodiment 1

The following description will discuss an embodiment of the present invention with reference to FIGS. 1 and 2.

Figure 2A:
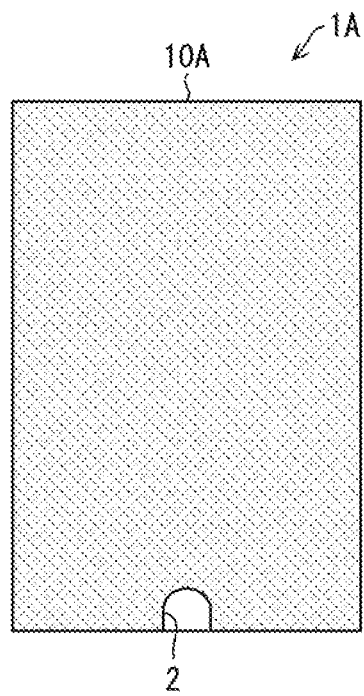
FIG. 2A is a front view illustrating a configuration of a liquid crystal panel of the liquid crystal display device.
Figure 2B:
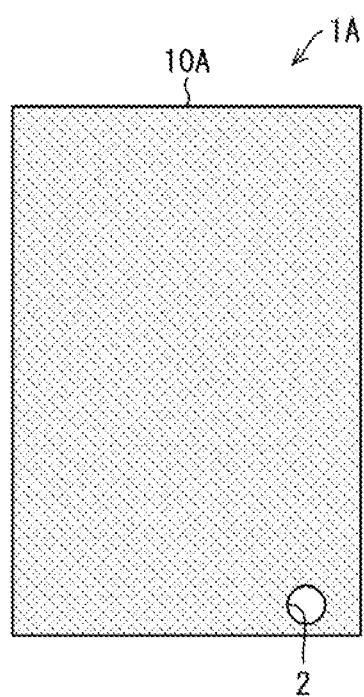
FIG. 2B is a front view illustrating a configuration of a variation of the liquid crystal panel of the liquid crystal display device.

A configuration of a liquid crystal display device 1A in accordance with Embodiment 1 will be described below with reference to FIG. 1, FIG. 2A and FIG. 2B. FIG. 1 is a cross-sectional view illustrating the configuration of the liquid crystal display device 1A in accordance with Embodiment 1. FIG. 2A is a front view illustrating a configuration of a liquid crystal panel 10A of the liquid crystal display device 1A in accordance with Embodiment 1. FIG. 2B is a front view illustrating a configuration of a variation of the liquid crystal panel 10A of the liquid crystal display device 1A in accordance with Embodiment 1.

The liquid crystal display device 1A in accordance with Embodiment 1 includes, for example, a mobile terminal such as a smartphone. As illustrated in FIG. 2A, the liquid crystal display device 1A includes a camera placement part 2 which serves as a display section and which is made by notching an edge part of the liquid crystal panel 10A. Note that the camera placement part 2 does not necessarily need to be provided so as to notch the edge part of the liquid crystal panel 10A. As illustrated in FIG. 2B, the camera placement part 2 can be provided by making a hole in the edge part of the liquid crystal panel 10A. As necessary, the camera placement part 2 can be provided at any part of the liquid crystal panel 10A.

Note, however, that the camera placement part 2 in accordance with Embodiment 1 is not of a type which is formed by notching a glass or making a hole in a glass. The camera placement part 2 is configured so that only in the camera placement part 2, for example, no pixel electrode, no black matrix, no color filter layer, and no wiring are present. This allows the camera placement part 2 to have a transmittance of nearly 100%, so that image capturing by a camera is not interfered with.

If a glass is notched or a hole is made in a glass, then a certain amount of sealing region and/or a certain structure for maintaining strength is/are necessary for (i) maintaining strength of adhesion between glass panels and (ii) preventing liquid crystals from leaking. According to Embodiment 1, however, the shape of a glass is untouched. This makes it unnecessary to provide any additional sealing or structures around the camera placement part 2. Therefore, there is no large frame region around the camera placement part 2, so that it is possible to efficiently provide the camera placement part 2 having a narrow frame. In addition, according to Embodiment 1, the camera placement part 2 is not separated from the rest of the display panel 10A by sealing. This causes a liquid crystal layer to fill not only an active area (display section) but also the camera placement part 2.

Specifically, as illustrated in FIG. 1, the liquid crystal display device 1A in accordance with Embodiment 1 is configured so that the liquid crystal panel 10A includes: a lower polarizing plate 11, a thin film transistor (TFT) substrate 12, a TFT-side alignment film 13A, a liquid crystal layer 14, a film-side alignment film 15A, a color filter substrate 16, and an upper polarizing plate 17. Note that a camera 3 is provided so as to face the TFT substrate 12, and captures external light entering through the color filter substrate 16, the film-side alignment film 15A, the liquid crystal layer 14, the TFT-side alignment film 13A, and the TFT substrate 12, in this order. In addition, an observer observing the display on the liquid crystal panel 10A is to observe a displayed image which excludes a part corresponding to the hole of the camera placement part 2.

The lower polarizing plate 11 is provided on a side of the TFT substrate 12, which side is opposite a side facing the liquid crystal layer 14. The upper polarizing plate 17 is provided on a side of the color filter substrate 16, which side is opposite a side facing the liquid crystal layer 14. The lower polarizing plate 11 and the upper polarizing plate 17 are provided so that respective transmission axes of the lower polarizing plate 11 and the upper polarizing plate 17 are orthogonal to each other.

The TFT substrate 12 is a substrate in which thin film transistors (TFTs) serving as switching elements (not illustrated) are provided in an array.

The color filter substrate 16 has a structure in which, for example, a filter layer 16b is provided on a glass substrate 16a. The filter layer 16b is configured so that a red filter R, a green filter G, a blue filter B, and a black matrix BL are provided in an array.

The liquid crystal layer 14 is provided between a pair of the TFT substrate 12 and the color filter substrate 16 which are provided so as to face each other. The liquid crystal layer 14 is filled with the liquid crystal molecules 14a.

The TFT-side alignment film 13A and the film-side alignment film 15A are each made of, for example, a polyimide resin. The TFT-side alignment film 13A is provided on the side of the TFT substrate 12, which side faces the liquid crystal layer 14. The film-side alignment film 15A is provided on the side of the color filter substrate 16, which side faces the liquid crystal layer 14. An alignment function is imparted to the TFT-side alignment film 13A and the film-side alignment film 15A which are provided all over the surfaces of the liquid crystal panel 10A. This, when no voltage is applied, causes the liquid crystal molecules 14a in the liquid crystal layer 14 to be oriented in a certain direction in which the TFT substrate 12 and the color filter substrate 16 extend. Specifically, in a case of, for example, an Advanced Fringe Field Switching (AFFS) mode, an alignment function is imparted to the TFT-side alignment film 13A and the film-side alignment film 15A by a rubbing treatment or optical alignment so that the liquid crystal molecules 14a are oriented together in a direction in which an absorption axis of one of the lower polarizing plate 11 and the upper polarizing plate 17 (which are orthogonal to each other) extends.

Meanwhile, a liquid crystal display device 1A, in which light to enter a camera 3 passes through part of the liquid crystal panel 10A poses the following problem.

Specifically, the following problem-free cases cannot be completely achieved in actuality: (i) a case where light exiting a subject and then entering the camera 3 has no polarized light component at all and (ii) an optical system of the camera 3 has no polarized light component at all.

In general, even an optical system of the camera 3 has slight birefringence. This is because, for example, (i) polarization occurs at a refraction surface as a result of bending a lens or a prism and (ii) it is nearly impossible that light, which has passed through a material (including a coating) made of resin, has no birefringence. In addition, not only does direct light coming from the subject through a resin or the like has polarized light (polarization plane), but even light coming from a reflecting surface such as a water surface in scenery under sunlight also has polarized light (polarization plane).

Because liquid crystals having considerable birefringence effect are present between such light from a subject and a lens, a camera image obtained through the liquid crystals is considerably different from a camera image obtained without the liquid crystals. Specifically, the original contrast is not obtained. In addition, following problems, for example, may occur: (i) black crushing occurs to a part of an image, (ii) an originally colorless part is colored, and (iii) an image becomes colored so as to be different from a color of light to be visually recognized.

As in the case of the liquid crystal display device 1A in accordance with Embodiment 1, such problems, which do not occur in a case of notching a glass or making a hole in a glass of a liquid crystal panel 10A, are caused by a structure in which the liquid crystal panel 10A and the camera placement part 2 are not separated by sealing. These problems occurred in exchange for narrowing the frame of the camera part.

Meanwhile, these problems are caused by the birefringence effect of liquid crystals and can therefore be resolved by, for example, having a certain relationship between (i) the retardation R1 of the first part of the liquid crystal layer 14, which first part is located in the camera light transmissive region S1 and (ii) the retardation R2 of the second part of the liquid crystal layer 14, which second part is located in the non-camera light transmissive region S2.

Specifically, in a case where the liquid crystal display device 1A employs a typical In-Plane-Switching (IPS) mode, the upper polarizing plate 17 and the lower polarizing plate 11 are provided with the liquid crystal layer 14 therebetween so that respective the absorption axes of the upper polarizing plate 17 and the lower polarizing plate 11 are orthogonal to each other. In so doing, the liquid crystal molecules 14a of the liquid crystal layer 14 are oriented in a direction matching (i) the absorption axis of the upper polarizing plate 17 or (ii) the absorption axis of the lower polarizing plate 11.

Although light from a backlight of the liquid crystal panel 10A is linearly polarized light due to the lower polarizing plate 11, there is no change in polarization state of light in the liquid crystal layer 14, because the liquid crystal molecules 14a are parallel or orthogonal to the linearly polarized light. This causes light to be blocked by the upper polarizing plate 17 having the absorption axis which is orthogonal to the absorption axis of the lower polarizing plate 11. This causes the liquid crystal panel 10A to show black display.

Meanwhile, in a case where a voltage is applied to pixels, the liquid crystal molecules 14a of the liquid crystal layer 14 rotate so as to be oriented within a plane extending parallel to a flat plate. This results in an angle between an axis of light and a slow axis of the liquid crystal layer 14, so that the light changes.

The linearly polarized light entering the liquid crystal layer 14 changes into linearly polarized light which is line-symmetrical with respect to the slow axis of the liquid crystal layer 14, in a case where the relationship between the retardation R and the wavelength λ of the light meets the following conditions:

Retardation $R=d\Delta n=\lambda/2(2k+1)$ where (A) dΔn, which represents the retardation R, is a product of (i) a refractive index difference Δn (≠0) indicative of an anisotropic refractive index of the liquid crystal layer 14 and (ii) a thickness d of the liquid crystal layer 14 and (B) k is 0 or an integer.

In a case where the liquid crystal display device 1A employs a typical IPS mode, the liquid crystal display device 1A is designed so that applying a voltage to the liquid crystal layer 14 causes the slow axis of the liquid crystal layer 14 to be moved to have an angle of 45° with respect to the absorption axes of the lower polarizing plate 11 and of the upper polarizing plate 17. This causes the lower polarizing plate 11 and the upper polarizing plate 17, which are orthogonal to each other, to each have a maximum transmittance. A desired gradation of an image displayed with a halftone can be achieved by adjusting an applied voltage in a range between (i) a white voltage which is the voltage applied so that the slow axis has the angle of 45° and (ii) no voltage.

In response to an increase in retardation R (which is the product dΔn of (i) the refractive index difference Δn (≠0) indicative of the anisotropic refractive index of the liquid crystal layer 14 and (ii) the thickness d of the liquid crystal layer 14), the state of light changes. For example, the light, which is linearly polarized light when entering the liquid crystal layer 14, changes into elliptically polarized light, further changes into linearly polarized light under the above-described condition of retardation R=λ/2, further changes into elliptically polarized light, and then returns to originally directed linearly polarized light when mλ=dΔn (where m is a positive integer).

Specifically, in a case where the liquid crystal layer 14 meets the condition "mλ=dΔn" (where m is a positive integer), light having a wavelength λ passes through the liquid crystal layer 14 while retaining an original state, irrespective of a polarization direction of light entering the camera.

The above description discussed an example in which a user visually observes light from a backlight, which light has passed through the lower polarizing plate 11, the liquid crystal layer 14, and the upper polarizing plate 17 and then reached the user. However, the same is true of a case where external light (from a user side) passes through the liquid crystal layer 14 and then enters the camera 3. Specifically, even in a case where light coming from a subject has a polarized light component, setting the condition "λ=dΔn" makes it possible to avoid a phenomenon in which the light reaches the camera 3 while the light is colored or somewhat blocked due to the interaction between the polarized light component and the liquid crystal layer 14.

Therefore, according to the liquid crystal display device 1A of Embodiment 1, the liquid crystal panel 10A is configured so that: the first part of the liquid crystal layer 14, which first part is located in the camera light transmissive region S1 allowing the light to enter the camera 3 to pass therethrough, has a retardation R1 represented by the following formula:

$R1=m\lambda$ where (i) λ is a wavelength of the light passing through the liquid crystal layer 14 and (ii) m is a positive integer; and the second part of the liquid crystal layer, which second part is located in a non-camera light transmissive region S2 excluding the camera light transmissive region S1, has a retardation R2 represented by the following formula:

$R2=\lambda/2(2k+1)$ where (i) λ is the wavelength of the light passing through the liquid crystal layer and (ii) k is 0 or an integer.

According to this configuration, light having the wavelength λ and entering the first part of the liquid crystal layer 14 passes through the first part of the liquid crystal layer 14 while retaining an original state, irrespective of a polarization direction of the light. Therefore, even in a case where light passing through the first part of the liquid crystal layer 14 is linearly polarized light, for example, light entering the camera 3 maintains linearly polarized light without, for example, being blocked.

Meanwhile, according to Embodiment 1, the retardation R2 of the second part of the liquid crystal layer 14, which second part is located in the non-camera light transmissive region S2 excluding the camera light transmissive region S1, is represented by the following formula:

$$R2=\lambda/2(2k+1)$$

where (i) λ is the wavelength of the light passing through the liquid crystal layer and (ii) k is 0 or an integer.

Therefore, a desired gradation of an image displayed by the liquid crystal panel 10A can be achieved by causing the slow axis of the liquid crystal layer 14 to be moved to have an angle of 45° with respect to the absorption axes of the upper polarizing plate 17 and the lower polarizing plate 11 (which are orthogonal to each other) through applying a voltage to the lower polarizing plate 11 and to the upper polarizing plate 17.

It is therefore possible to provide a liquid crystal display device 1A which can prevent a camera image from being adversely affected by the birefringence of external polarized light which enters the camera 3 through the liquid crystal layer 14.

In regard to the wavelength λ, while a human eye can visually recognize light having a wavelength range of 380 nm to 780 nm, it is not possible to uniformly control the entirety of the wavelength range. Therefore, in general, an optical design preferably targets light which has a wavelength λ of around 550 nm where a luminous efficacy is highest.

According to the liquid crystal display device 1A of Embodiment 1, the thickness of the liquid crystal layer 14 is adjusted, as illustrated in FIG. 1, so as to achieve the above-described relationship between (i) the retardation R1 of the first part of the liquid crystal layer 14, which first part is located in the camera light transmissive region S1 and (ii) the retardation R2 of the second part of the liquid crystal layer 14, which second part is located in the non-camera light transmissive region S2. Specifically, the first part and the second part of the liquid crystal layer 14 have a thickness d1 and a thickness d2, respectively. Then, the thickness d1 is twice as large as the thickness d2.

In a case where the liquid crystal layer 14 is thus formed, the retardation R1 and the retardation R2 of the liquid crystal layer 14 are represented as follows.

$$R1=d1\times\Delta n=m\lambda \text{ (where } m \text{ is a positive integer)}$$

$$R2=d2\times\Delta n$$

According to the liquid crystal display device 1A of Embodiment 1, the following is true.

$$d1=2\times d2$$

It is therefore possible to derive the following formula:

$$R2=d2\times\Delta n=d1\times\Delta n/2=m\lambda/2=\lambda/2(2k+1)$$

where k is 0 or an integer.

Consequently, by causing the thickness d1 of the first part of the liquid crystal layer 14 to be twice as large as the thickness d2 of the second part of the liquid crystal layer 14, it is possible to achieve the relationship between the retardation R1 and the retardation R2.

According to the liquid crystal display device 1A of Embodiment 1, such thicknesses of the liquid crystal layer 14 are achieved by adjusting the height of the TFT-side alignment film 13A.

Specifically, as illustrated in FIG. 1, the liquid crystal display device 1A in accordance with Embodiment 1 is configured so that (i) the TFT substrate 12 and the color filter substrate 16, which are provided so as to face each other with the liquid crystal layer 14 of the liquid crystal panel 10A therebetween, are provided with the TFT-side alignment film 13A and the film-side alignment film 15A, respectively and (ii) a second part of the TFT-side alignment film 13A, which second part is located in the non-camera light transmissive region S2, is disposed on the TFT substrate 12 with a transparent layer 18 therebetween. The transparent layer 18 is made of a transparent resin. A first part of the TFT-side alignment film 13A, which first part is located in the camera light transmissive region S1, is disposed directly on the TFT substrate 12.

On the color filter substrate 16 side, as ordinarily, the film-side alignment film 15A, which has a flat surface in contact with the liquid crystal layer 14, is provided on the color filter substrate 16.

On the TFT substrate 12 side, the first part of the TFT-side alignment film 13A, as ordinarily, has a flat surface in contact with the liquid crystal layer 14 and is provided on the TFT substrate 12. The second part of the TFT-side alignment film 13A is disposed on the TFT substrate 12 with the transparent layer 18 therebetween and is provided so as to be in contact with the liquid crystal layer 14.

Therefore, by adjusting a thickness of the transparent layer 18 when the TFT-side alignment film 13A is formed, it is possible to cause the thickness d1 of the first part of the liquid crystal layer 14, which first part is located in the camera light transmissive region S1, to be twice as large as the thickness d2 of the second part of the liquid crystal layer 14, which second part is located in the non-camera light transmissive region S2.

Note that the transparent layer 18 does not necessarily need to be on an uppermost layer before the TFT-side alignment film 13A is applied, but can be a transparent layer provided at a lower level. As well known, the following may be attempted for the purpose of (i) preventing a parasitic capacitance between a pixel electrode and a bus line such as a signal line from having an adverse effect on image display and (ii) reducing a load capacity so as to prevent an increase in electric power consumption. That is, an increase in aperture ratio is attempted by forming a resin insulating film with a certain thickness below the pixel electrode, and then causing the pixel electrode to overlap the signal line. In many such cases, the insulating film needs to have a certain thickness, such as 3 μm, so that the capacitance is kept small. According to Embodiment 1, it is important that the liquid crystal layer 14 has varying thicknesses between the camera light transmissive region S1 and the non-camera light transmissive region S2. Such varying thicknesses can also be achieved by utilizing the thickness of a such a film at a below level. Specifically, it is possible that the non-camera light transmissive region S2 has a structure in which an insulating film is provided below the pixel electrode, whereas the camera light transmissive region S1 includes no insulating film. In the first place, the camera light transmissive region S1 includes a part including no wiring or pixel electrodes for displaying an image. Therefore, even in a case where the insulating film is absent, there is no adverse effect on the display performance of the display device.

The liquid crystal display device 1A of Embodiment 1 is configured so that (i) the TFT substrate 12 and the color filter substrate 16, which are provided so as to face each other with the liquid crystal layer 14 of the liquid crystal panel 10A therebetween, are provided with the TFT-side alignment film 13A and the film-side alignment film 15A, respectively, (ii) the second part of the TFT-side alignment film 13A, which second part is located in the non-camera light transmissive region S2, is disposed on a transparent layer-provided part on the TFT substrate 12, and (iii) the first part of the TFT-side alignment film 13A, which first part is located in the camera light transmissive region S1, is disposed on a transparent layer-absent part on the TFT substrate 12.

According to this configuration, the thickness of the liquid crystal layer 14 is adjusted by causing only a first part of the transparent layer 18 (provided on the TFT substrate 12 side), which first part is located in the camera light transmissive region S1, to be absent. Then, (i) the second part of the liquid crystal layer 14, which second part is located in the non-camera light transmissive region S2, meets the "λ/2" condition and (ii) the first part of the liquid crystal layer 14, which first part is located in the camera light transmissive region S1, meets the "λ" condition.

Specifically, for example, assume that (i) the refractive index difference Δn is 0.11 and (ii) the thickness d2 of the liquid crystal layer 14 is 3 μm. In this case, when the wavelength λ of light is 550 nm, the retardation R2 in the second part located in the non-camera light transmissive region S2 meets the following: "R2=d1Δ=0.33". Note that although the value of the retardation R2 is not λ/2 with respect to the wavelength λ (=550 nm) of the light, no problem in actuality occurs. This is because adjustment of the retardation includes adjustment of a part where the alignment regulating force of the TFT-side alignment film 13A and the film-side alignment film 15A restricts the movements of the liquid crystal molecules 14a.

According to Embodiment 1, the transparent layer 18 has a thickness of 3 μm. This makes it easy to cause the thickness d1 of the first part of the liquid crystal layer 14 to twice as large as the thickness d2 of the second part of the liquid crystal layer 14 by causing the first part of the transparent layer 18 to be absent.

Embodiment 2

Figure 3:
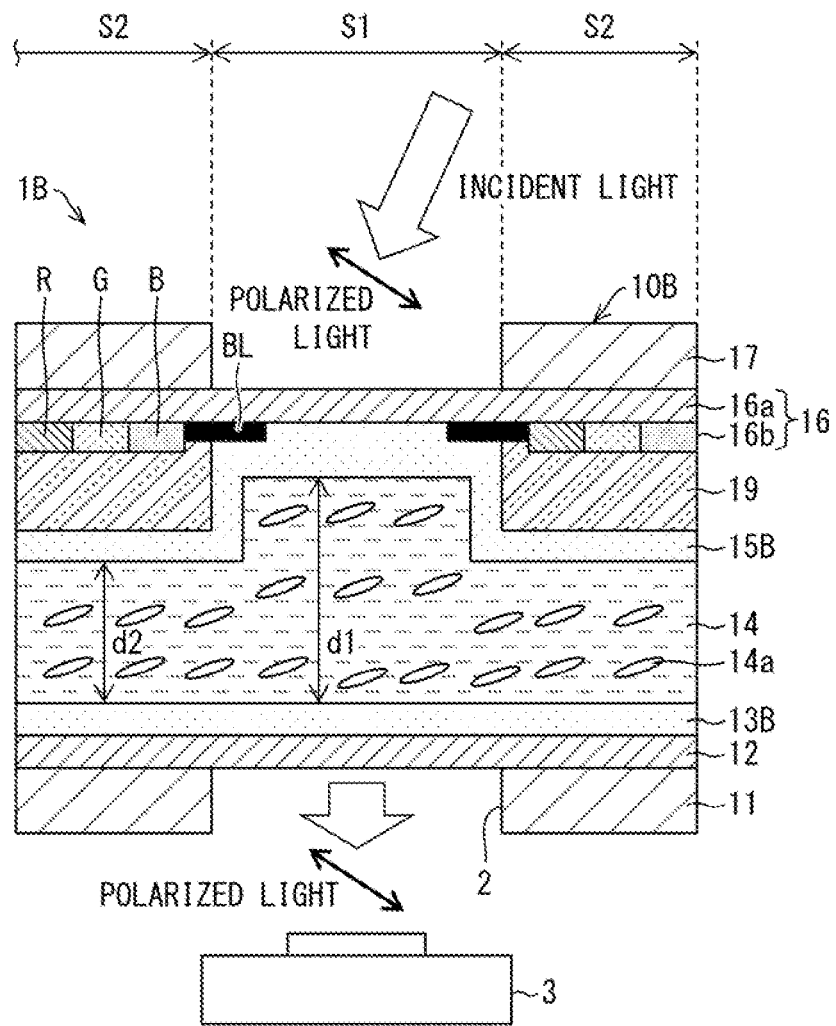
FIG. 3 is a cross-sectional view illustrating a configuration of a liquid crystal display device in accordance with Embodiment 2 of the present invention.
Figure 4:
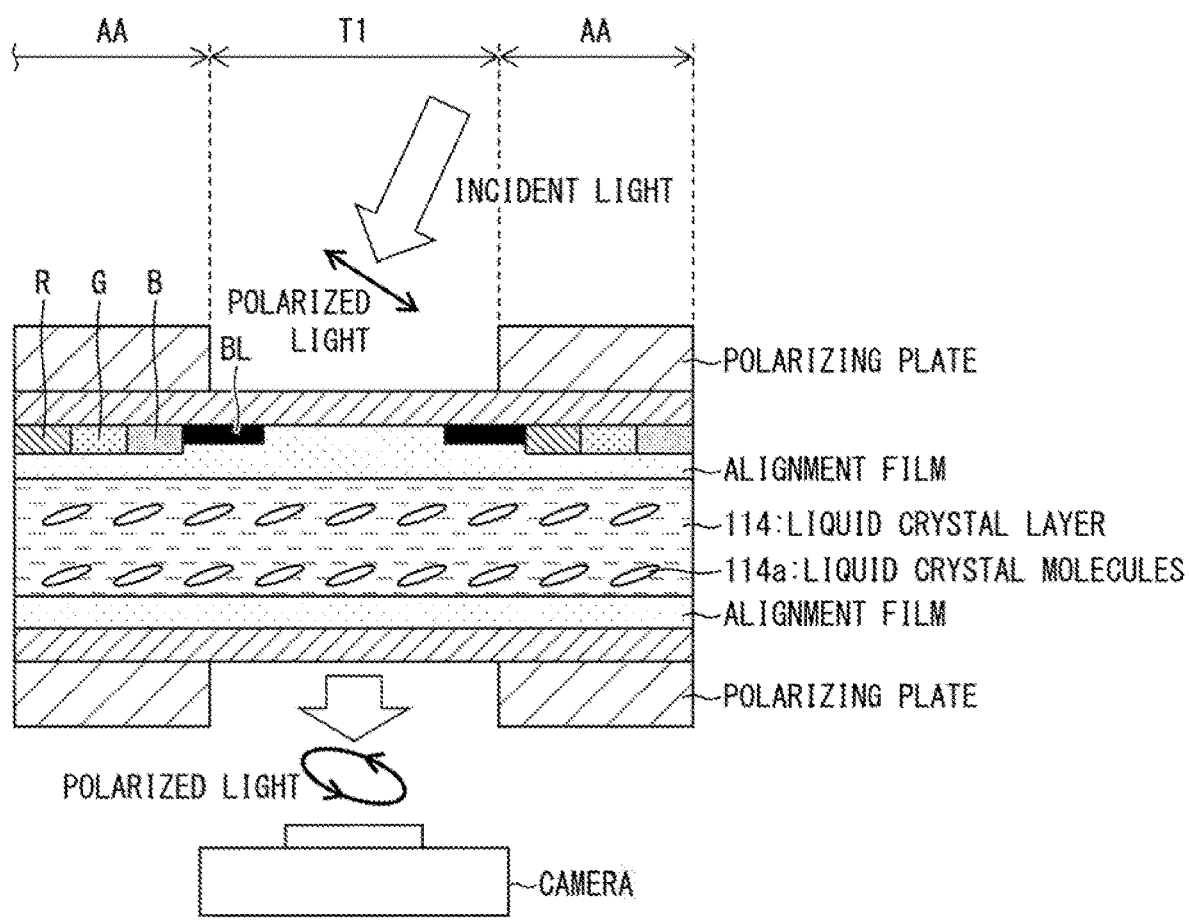
FIG. 4 is a cross-sectional view illustrating a configuration of a conventional liquid crystal display device in which light to enter a camera passes through a part of a display section.

The following description will discuss another embodiment of the present invention with reference to FIG. 3. Note that features of Embodiment 2 other than those described in Embodiment 2 are identical to those of Embodiment 1. For convenience, members having functions identical to those illustrated in the drawings of Embodiment 1 are given identical reference signs, and their descriptions are omitted.

As illustrated in FIG. 3, a configuration of a liquid crystal display device 1B in accordance with Embodiment 2 is different from the configuration of the liquid crystal display device 1A in accordance with Embodiment 1 in that a height of a film-side alignment film 15B located on a color filter substrate 16 side is adjusted so that there is a difference in thickness between (i) a first part of a liquid crystal layer 14, which first part is located in a camera light transmissive region S1 and (ii) a second part of the liquid crystal layer 14, which second part is located in a non-camera light transmissive region S2.

The configuration of the liquid crystal display device 1B in accordance with Embodiment 2 will be described below with reference to FIG. 3. FIG. 3 is a cross-sectional view illustrating the configuration of the liquid crystal display device 1B in accordance with Embodiment 2.

As illustrated in FIG. 3, a liquid crystal panel 10B of the liquid crystal display device 1B in accordance with Embodiment 2 is configured so that the height of the film-side alignment film 15B located on the color filter substrate 16 side is adjusted so that there is a difference in thickness between (i) the first part of a liquid crystal layer 14, which first part is located in the camera light transmissive region S1 and (ii) the second part of the liquid crystal layer 14, which second part is located in the non-camera light transmissive region S2.

Specifically, (i) a TFT substrate 12 and the color filter substrate 16, which are provided so as to face each other with the liquid crystal layer 14 of the liquid crystal panel 10B therebetween, are provided with a TFT-side alignment film 13B and the film-side alignment film 15B, respectively. Then, a second part of the film-side alignment film 15B, which second part is located in the non-camera light transmissive region S2, is disposed on the color filter substrate 16 with a transparent layer 19 therebetween. The transparent layer 19 is made of, for example, a transparent resin. A first part of the film-side alignment film 15B, which first part is located in the camera light transmissive region S1, is disposed directly on the color filter substrate 16.

On the TFT substrate 12 side, as ordinarily, the TFT-side alignment film 13B, which has a flat surface in contact with the liquid crystal layer 14, is provided on the TFT substrate 12.

On the color filter substrate 16 side, the first part of the film-side alignment film 15B, as ordinarily, has a flat surface in contact with the liquid crystal layer 14 and is provided on the color filter substrate 16. The second part of the film-side alignment film 15B is disposed on the color filter substrate 16 with the transparent layer 19 therebetween and is provided so as to be in contact with the liquid crystal layer 14.

Therefore, by adjusting a thickness of the transparent layer 19 when the film-side alignment film 15B on the color filter substrate 16 side is formed, it is possible to cause a thickness d1 of the first part of the liquid crystal layer 14, which first part is located in the camera light transmissive region S1, to be twice as large as a thickness d2 of the second part of the liquid crystal layer 14, which second part is located in the non-camera light transmissive region S2.

As well known, unnecessary unevenness in respective outermost surfaces of the color filter substrate 16 and the TFT substrate 12, which are in contact with the liquid crystal layer 14, is desirably prevented as much as possible so that the outermost surfaces are flat. This is because the flat outermost surfaces prevent the occurrence of display unevenness and bring about high contrast. In particular, a black layer and RGB layers of the color filter substrate 16 each tend to have a thickness of 1 μm to 3 μm. This makes it difficult to obtain flat surfaces. Therefore, in some cases, a planarizing layer is added to an outermost surface so as to impart flatness. There are methods in which such a planarizing layer is utilized for causing a difference in thickness between (i) the first part of the liquid crystal layer 14, which first part is located in the camera light transmissive region S1 and (ii) the second part of the liquid crystal layer 14, which second part is located in the non-camera light transmissive region S2. Specifically, it is effective to configure the structure so that the surface of the color filter is covered with a planarizing layer in the non-camera light transmissive region S2, whereas no planarizing layer is present in the camera light transmissive region S1. In the first place, the camera light transmissive region S1 is not a part to be used for displaying an image. Therefore, even in a case where the planarizing layer is absent, there is no adverse effect on the display performance of the display device. In addition, the color filter layer is absent in the camera light transmissive region S1. It is therefore unnecessary to provide a planarizing layer for preventing the unevenness of the color layers from causing any defects.

According to the liquid crystal display device 1B of Embodiment 2 also, (i) the liquid crystal layer 14 has a thickness d1 of, for example, 3 μm and (ii) the transparent layer 19 has a thickness of, for example, 3 μm. In this case, forming a transparent layer 19 having a thickness of 3 μm and having a hollow part poses a risk of leading to alignment deficiency which occurs because a material for the film-side alignment film 15B flows into the hollow part when the film-side alignment film 15B is applied, and consequently the thickness on another part of the film-side alignment film 15B becomes non-uniform.

In this case, therefore, it is an option to form, for example, a display panel including both (i) a transparent layer 18 provided on a TFT substrate 12 side and (ii) a transparent layer 19 provided on a color filter substrate 16 side. In such a case, the same effect can be obtained by causing the thicknesses of the first parts of the transparent layers 18 and 19, which first parts are located in the camera light transmissive region S1, to be approximately half of those of the second parts of the transparent layers 18 and 19, which second pars are located in the non-camera light transmissive region S2, through (i) forming the first parts by patterning with half-tone exposure and (ii) forming the second parts by patterning with full exposure. This allows for a reduction in depth of the hollow part, and therefore makes it possible to prevent the problem of alignment deficiency.

Instead of causing the thickness of the transparent layer 19 to be half and instead of forming the hollow part of the transparent layer 19 by half-tone exposure, it is alternatively possible to carry out filling with a photo spacer(s) for maintaining a cell thickness of the liquid crystal layer 14. This is because, in many cases, a photo spacer for maintaining a cell thickness is prepared by use of full exposure and half-tone exposure, and it is therefore easy to prepare a thin film.

[Recap]

A liquid crystal display device in accordance with Aspect 1 of the present invention is a liquid crystal display device (1A, 1B) including: a display section (liquid crystal panels 10A, 10B) including a liquid crystal layer 14; and a camera 3, the liquid crystal display device (1A, 1B) being configured so that light to enter the camera 3 passes through a part of the display section (liquid crystal panels 10A, 10B), the display section (liquid crystal panels 10A, 10B) being configured so that: a first part of the liquid crystal layer 14, which first part is located in a camera light transmissive region S1 allowing the light to enter the camera 3 to pass therethrough, has a retardation R1 represented by the following formula:

$R1=m\lambda$ where (i) λ is a wavelength of the light passing through the liquid crystal layer 14 and (ii) m is a positive integer; and a second part of the liquid crystal layer 14, which second part is located in a non-camera light transmissive region S2 excluding the camera light transmissive region S1, has a retardation R2 represented by the following formula:

$R2=\lambda/2(2k+1)$ where (i) λ is the wavelength of the light passing through the liquid crystal layer and (ii) k is 0 or an integer.

According to the configuration, the retardation R1 in the first part of the liquid crystal layer of the display section, which first part is located in the camera light transmissive region, is represented by the following formula:

$R1=m\lambda$ where (i) λ is the wavelength of the light passing through the liquid crystal layer and (ii) m is a positive integer.

According to this configuration, light having the wavelength λ and entering the first part of the liquid crystal layer passes through the first part of the liquid crystal layer while retaining an original state, irrespective of a polarization direction of the light. Therefore, even in a case where light passing through the first part of the liquid crystal layer is linearly polarized light, for example, light entering the camera maintains linearly polarized light without, for example, being blocked.

Meanwhile, the retardation R2 of the second part of the liquid crystal layer, which second part is located in the non-camera light transmissive region excluding the camera light transmissive region, is represented by the following formula:

$R2=\lambda/2(2k+1)$ where (i) λ is the wavelength of the light passing through the liquid crystal layer and (ii) k is 0 or an integer.

Therefore, a desired gradation of an image displayed by the display section can be achieved by causing the slow axis of the liquid crystal layer to be moved to have an angle of 45° with respect to the absorption axes of an upper polarizing plate and a lower polarizing plate (which are orthogonal to each other) through applying a voltage to the lower polarizing plate and to the upper polarizing plate.

It is therefore possible to provide a liquid crystal display device which can prevent a camera image from being adversely affected by the birefringence of external polarized light which enters a camera through the liquid crystal layer.

The liquid crystal display device (1A, 1B) in accordance with Aspect 2 of the present invention can be configured so that: the first part and the second part of the liquid crystal layer 14 have a thickness d1 and a thickness d2, respectively; and the thickness d1 is twice as large as the thickness d2.

The retardation R is represented by the product of the thickness d of the liquid crystal layer and the anisotropic refractive index Δn. It is therefore possible to derive the following formula:

$R1=d1\times\Delta n=m\lambda$ (where m is a positive integer)

$R2=d2\times\Delta n$

According to the liquid crystal display device in accordance with Aspect 2 of the present invention, the following is true.

$d1=2\times d2$

It is therefore possible to derive the following formula:

$R2=d2\times\Delta n=d1\times\Delta n/2=m\lambda/2=\lambda/2(2k+1)$ where k is 0 or an integer.

Consequently, by causing the thickness d1 of the first part of the liquid crystal layer to be twice as large as the thickness d2 of the second part of the liquid crystal layer, it is possible to achieve the relationship between the retardation R1 and the retardation R2.

It is therefore possible to provide a liquid crystal display device which can prevent a camera image from being adversely affected by the birefringence of external polarized light which enters a camera through the liquid crystal layer.

The liquid crystal display device 1A in accordance with Aspect 3 of the present invention can be configured to further include: a TFT substrate 12; a color filter substrate 16; a TFT substrate-side alignment film (TFT-side alignment film 13A) which is provided on the TFT substrate 12; and a color filter substrate-side alignment film (film-side alignment film 15A) which is provided on the color filter substrate 16, the TFT substrate 12 and the color filter substrate 16 being provided so as to face each other with the liquid crystal layer 14 of the display section (liquid crystal panel 10A) therebetween, a second part of the TFT substrate-side alignment film (TFT-side alignment film 13A), which second part is located in the non-camera light transmissive region S2, being disposed on a transparent layer-provided part on the TFT substrate 12, and a first part of the TFT substrate-side alignment film (TFT-side alignment film 13A), which first part is located in the camera light transmissive region S1, being disposed on a transparent layer-absent part on the TFT substrate 12.

According to the configuration, on the color filter substrate side, as ordinarily, the color filter substrate-side alignment film, which has a flat surface in contact with the liquid crystal layer, is provided on the color filter substrate.

On the TFT substrate side, the first part of the TFT substrate-side alignment film, as ordinarily, has a flat surface in contact with the liquid crystal layer and is provided on the TFT substrate. The second part of the TFT substrate-side alignment film is disposed on the TFT substrate with the transparent layer therebetween and is provided so as to be in contact with the liquid crystal layer.

Therefore, by adjusting a thickness of the transparent layer when the TFT substrate-side alignment film is formed, it is possible to cause the thickness d1 of the first part of the liquid crystal layer, which first part is located in the camera light transmissive region, to be twice as large as the thickness d2 of the second part of the liquid crystal layer, which second part is located in the non-camera light transmissive region.

The liquid crystal display device 1B in accordance with Aspect 4 of the present invention can be configured to further include: a TFT substrate 12; a color filter substrate 16; a TFT substrate-side alignment film (TFT-side alignment film 13B) which is provided on the TFT substrate 12; and a color filter substrate-side alignment (film-side alignment film 15B) film which is provided on the color filter substrate 16, the TFT substrate 12 and the color filter substrate 16 being provided so as to face each other with the liquid crystal layer 14 of the display section (liquid crystal panel 10B) therebetween, a second part of the color filter substrate-side alignment film (film-side alignment film 15B), which second part is located in the non-camera light transmissive region S2, is disposed on the color filter substrate 16 with a transparent layer 19 therebetween, and a first part of the color filter substrate-side alignment film (film-side alignment film 15B), which first part is located in the camera light transmissive region S1, is disposed directly on the color filter substrate 16.

According to the configuration, on the TFT substrate side, as ordinarily, the TFT substrate-side alignment film, which has a flat surface in contact with the liquid crystal layer, is provided on the TFT substrate.

On the color filter substrate side, the first part of the color filter substrate-side alignment film, as ordinarily, has a flat surface in contact with the liquid crystal layer and is provided on the color filter substrate. The second part of the color filter substrate-side alignment film is disposed on the color filter substrate with the transparent layer therebetween and is provided so as to be in contact with the liquid crystal layer.

Therefore, by adjusting a thickness of the transparent layer when the color filter substrate-side alignment film is formed, it is possible to cause the thickness d1 of the first part of the liquid crystal layer, which first part is located in the camera light transmissive region, to be twice as large as the thickness d2 of the second part of the liquid crystal layer, which second part is located in the non-camera light transmissive region.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 1A, 1B Liquid crystal display device
2 Camera placement part
3 Camera
10A, 10B Liquid crystal panel (display section)
11 Lower polarizing plate
12 TFT substrate
13A, 13B TFT-side alignment film
14 Liquid crystal layer
14a Liquid crystal molecule
15A, 15B Film-side alignment film
16 Color filter substrate
16a Glass substrate
16b Filter layer
17 Upper polarizing plate
18, 19 Transparent layer
R1, R2 Retardation
S1 Camera light transmissive region
S2 Non-camera light transmissive region
λ Wavelength

The invention claimed is:

1. A liquid crystal display device comprising:
a display section including a liquid crystal layer; and
a camera, the liquid crystal display device being configured so that light to enter the camera passes through a part of the display section,
wherein the display section being configured so that:
a first part of the liquid crystal layer, which first part is located in a camera light transmissive region allowing the light to enter the camera to pass therethrough, has a retardation R1 represented by the following formula:

$R1 = m\lambda$ where (i) λ is a wavelength of the light passing through the liquid crystal layer and (ii) m is a positive integer; and
a second part of the liquid crystal layer, which second part is located in a non-camera light transmissive region excluding the camera light transmissive region, has a retardation R2 represented by the following formula:

$R2 = \lambda/2(2k+1)$ where (i) λ is the wavelength of the light passing through the liquid crystal layer and (ii) k is 0 or an integer, and
wherein the camera light transmissive region is not provided with any of a polarizing plate, a pixel electrode, a color filter and a wiring.

2. The liquid crystal display device as set forth in claim 1, wherein:
the first part and the second part of the liquid crystal layer have a thickness d1 and a thickness d2, respectively; and
the thickness d1 is twice as large as the thickness d2.

3. The liquid crystal display device as set forth in claim 2, further comprising:
 a thin film transistor (TFT) substrate;
 a color filter substrate;
 a TFT substrate-side alignment film which is provided on the TFT substrate; and
 a color filter substrate-side alignment film which is provided on the color filter substrate, the TFT substrate and the color filter substrate being provided so as to face each other with the liquid crystal layer therebetween, a second part of the TFT substrate-side alignment film, which second part is located in the non-camera light transmissive region, being disposed on a transparent layer provided part on the TFT substrate, and a first part of the TFT substrate-side alignment film, which first part is located in the camera light transmissive region, being disposed on a transparent layer-absent part on the TFT substrate.

4. The liquid crystal display device as set forth in claim 2, further comprising:
 a thin film transistor (TFT) substrate;
 a color filter substrate;
 a TFT substrate-side alignment film which is provided on the TFT substrate; and
 a color filter substrate-side alignment film which is provided on the color filter substrate, the TFT substrate and the color filter substrate being provided so as to face each other with the liquid crystal layer therebetween, a second part of the color filter substrate-side alignment film, which second part is located in the non-camera light transmissive region, is disposed on the color filter substrate with a transparent layer therebetween, and a first part of the color filter substrate-side alignment film, which first part is located in the camera light transmissive region, is disposed directly on the color filter substrate.

\* \* \* \* \*